(12) United States Patent
Stineman (10) Patent No.: US 6,931,825 B2
(45) Date of Patent: Aug. 23, 2005

(54) VIBRATION DAMPING ASSEMBLY

(76) Inventor: Terry J. Stineman, 17220 Fairway Dr., Lagrange, OH (US) 44050

( * ) Notice: Subject to any disclaimer, the term of this patent is extended or adjusted under 35 U.S.C. 154(b) by 0 days.

(21) Appl. No.: 10/685,827

(22) Filed: Oct. 14, 2003

(65) Prior Publication Data
US 2004/0134176 A1 Jul. 15, 2004

Related U.S. Application Data

(60) Provisional application No. 60/418,418, filed on Oct. 14, 2002.

(51) Int. Cl.[7] ............................................... A01D 69/00
(52) U.S. Cl. ............................................... 56/11.6; 56/6
(58) Field of Search ............................ 56/11.6, 10.8, 56/6; 474/133–138

(56) References Cited

U.S. PATENT DOCUMENTS

| 3,951,223 | A |   | 4/1976 | Kamlukin |
| 4,068,452 | A | * | 1/1978 | Schaefer et al. ............. 56/11.6 |
| 4,144,772 | A |   | 3/1979 | Brackin et al. |
| 4,473,362 | A |   | 9/1984 | Thomey et al. |
| 5,769,747 | A |   | 6/1998 | Kuhn et al. |
| 6,033,330 | A |   | 3/2000 | Wong et al. |
| 6,264,578 | B1 |   | 7/2001 | Ayukawa |
| 6,293,880 | B1 | * | 9/2001 | Uyama ........................ 474/79 |
| 2002/0039942 | A1 |   | 4/2002 | Liu et al. |

FOREIGN PATENT DOCUMENTS

DE  39 39 821 A1  6/1991

* cited by examiner

*Primary Examiner*—Meredith C. Petravick
(74) *Attorney, Agent, or Firm*—Wegman Hessler & Vanderburg

(57) ABSTRACT

A vibration damping assembly may be used with a lawn tractor to reduce vibrations caused by operation of a mower deck. A pulley belt drive system includes a pulley belt connecting a drive pulley to one or more driven pulleys. The vibration damping assembly includes a first idler pulley and a second idler pulley to dampen associated vibrations caused during operation of the mower deck. The vibration damping assembly further includes biasing means, such as springs, to keep the first and second idler pulleys in contact with the pulley belt.

7 Claims, 7 Drawing Sheets

VIBRATION DAMPING ASSEMBLY

This application claims priority from U.S. provisional patent application Ser. No. 60/418,418, entitled VIBRATION DAMPING ASSEMBLY, filed on Oct. 14, 2002.

1. BACKGROUND OF THE INVENTION

A. Field of Invention

This invention pertains to the art of methods and apparatus for damping vibrations, and more specifically to damping vibrations in a lawn tractor equipped with a vegetation mower deck.

B. Description of the Related Art

It is known in the art that lawn tractors equipped with a vegetation mower deck produce vibration during operation of the cutting blades positioned within the mower deck. Such vibration may be at its greatest magnitude and frequency when the operator initially engages the cutting blades. For lawn tractors, the vibration can be felt throughout the vehicle, but often is noticed most prominently by the operator when gripping the lawn tractor's steering wheel. The operator may also feel such vibrations through the floor panels and operator seat.

As mower decks and the associated cutting blades attached within the decks are designed in increasing size, the corresponding vibration also tends to increase. Such vibration is augmented by the corresponding increase in engine size to power the larger cutting blades. Complex vibration damping systems are known in the art. However, what is needed is an effective and inexpensive way to reduce the vibration felt by the operator and transmitted throughout the lawn tractor.

The present invention provides methods and apparatus for reducing the vibration in a lawn tractor equipped with a mower deck. The difficulties inherent in the related art are therefore overcome in a way that is simple and efficient, while providing better and more advantageous overall results.

II. SUMMARY OF THE INVENTION

According to one aspect of the present invention, a lawn tractor is provided which includes a frame, an engine and a mower deck both supported on the frame. The mower deck has at least a first blade pulley connected to a first cutting blade wherein rotation of the first blade pulley causes a corresponding rotation of the first blade. The lawn tractor also has a drive system comprising a drive pulley connected to the engine and a pulley belt connecting the drive pulley to the first blade pulley (a driven pulley). A vibration damping mechanism with a first idler pulley is connected to a slack portion of the pulley belt and a second idler pulley is connected to a tension portion of the pulley belt.

Another aspect of the present invention includes first and second biasing means operatively connected to the first and second idler pulleys.

Yet another aspect of the present invention is the inclusion of an opening in the first and second idler pulleys allowing an associated tool to be inserted in the idler pulleys to assist in disengaging the idler pulleys from the vibration damping assembly.

An advantage of the present invention is a vibration damping assembly that reduces the vibrations generated during operation of a lawn tractor.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DEFINITIONS

It is known in the art of belt drive systems to have a "slack" side or portion of the belt and a "tension" side or portion. Throughout this patent, the term "slack portion" refers to the portion of the belt between the drive pulley and the nearest driven pulley where the belt moves from the drive pulley to the driven pulley. The term "tension portion" refers to the portion of the belt between the drive pulley and the nearest driven pulley where the belt moves from the driven pulley to the drive pulley. Any belt portion between two driven pulleys is not considered to be a slack portion or a tension portion.

Figure 2:
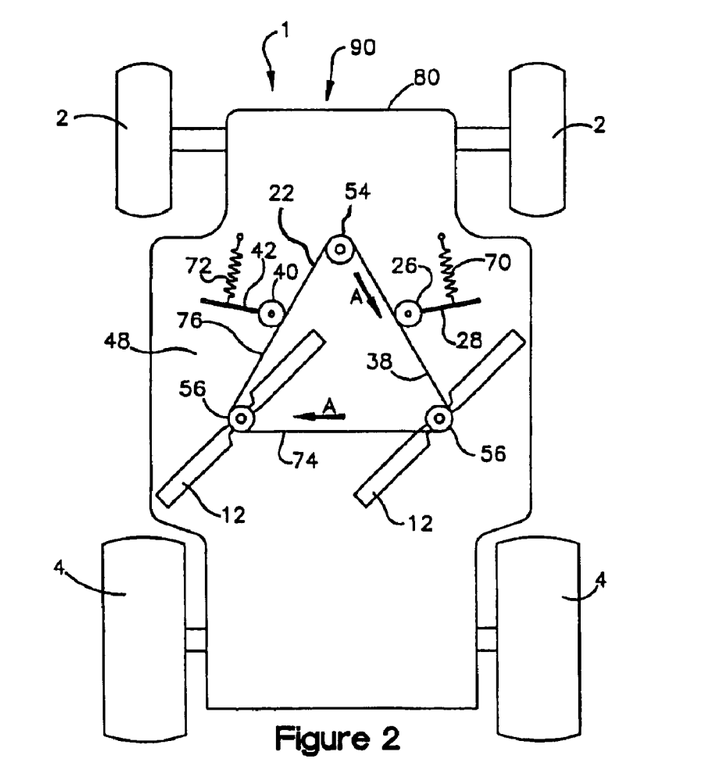
FIG. 2 is a schematic representation of a pulley belt drive system showing the inventive vibration damping assembly.
Figure 3:
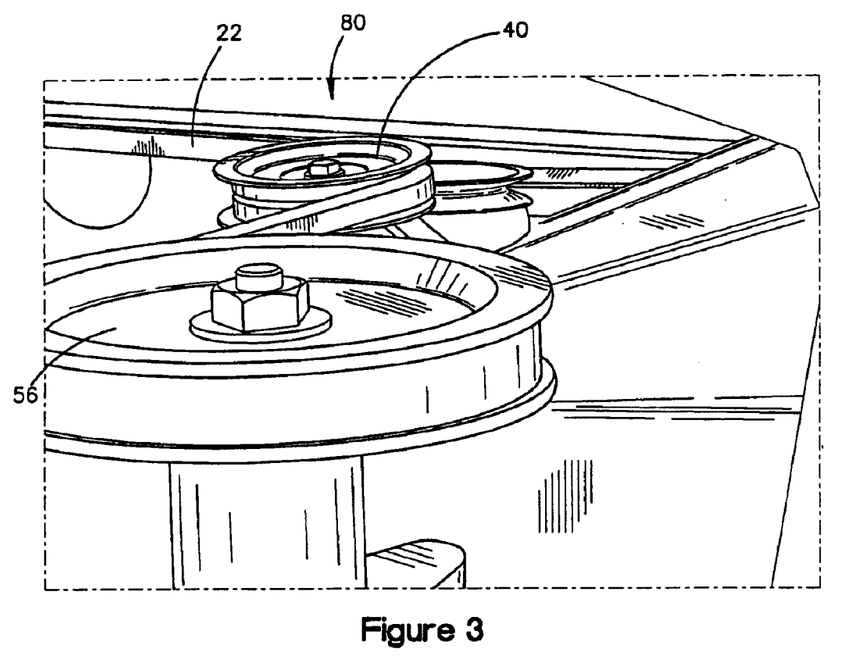
FIG. 3 is a close up view of a portion of the vibration damping assembly of FIG. 1 showing the second idler pulley in operation.

Thus, for example, with reference to FIG. 2, pulley 54 is a drive pulley and both pulleys referenced 56 are driven pulleys. Idler pulleys, such as 26 and 40, have no impact on the terms slack portion and tension portion. Reference A shows the direction of travel of belt 22 between the pulleys 54, 56 and 56. The portion of belt 38 between drive pulley 54 and driven pulley 56 (on the right hand side of FIG. 2) is the slack portion of the belt because the belt moves from the drive pulley 54 to the driven pulley 56. The portion of belt 76 between drive pulley 54 and driven pulley 56 (on the left hand side of FIG. 2) is the tension portion of the belt because the belt moves from the driven pulley 56 to the drive pulley 54. The portion of belt 74 between the two driven pulleys 56, 56 is considered neither the slack portion nor the tension portion of belt 22.

V. DESCRIPTION OF THE PREFERRED EMBODIMENT

Figure 1:
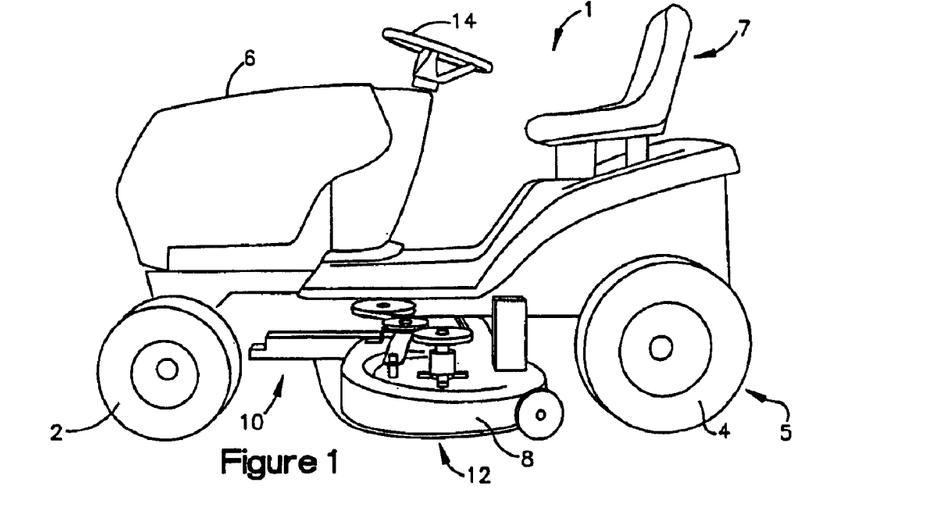
FIG. 1 is a side view of a lawn tractor with a mowing deck equipped with the vibration damping assembly of the present invention.

Referring now to the drawings wherein the showings are for purposes of illustrating a preferred embodiment of the invention only and not for purposes of limiting the same, FIG. 1 shows a lawn tractor 1 equipped with an operator seat 7, first and second front ground engaging wheels 2 and first and second rear ground engaging wheels 4. The rear ground engaging wheels 4 may be first and second rear drive wheels 5 for use in providing locomotion for the vehicle. The lawn tractor 1 may also include an engine 6, which may be of any type and configuration, for use in transferring power to drive the rear ground engaging wheels 4, 5. A mower deck 8 may be operatively connected to a frame 10 of the lawn tractor 1 in a manner well known in the art. Similarly, the engine 6 may be configured to provide power to drivingly engage at least one cutting blade 12 (see also FIG. 2) within the mower deck 8. The cutting blades 12 may be used to sever or cut vegetation as is well known in the art. A steering wheel 14 may be operatively attached to the front ground engaging wheels 2 for use in allowing the operator to selectively steer the lawn tractor 1 as desired. It is noted that any manner of steering and driving the lawn tractor 1 may be chosen with sound engineering judgment, including but not limited to Zero Radius Turning lawn tractors.

Figure 4:
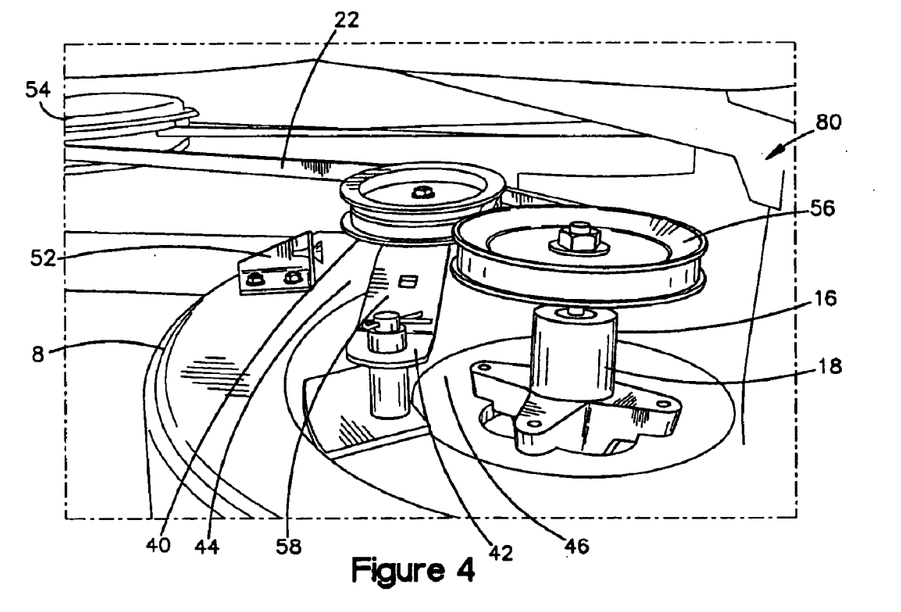
FIG. 4 is a close up view of a portion of the vibration damping assembly of FIG. 1 showing the second idler pulley attached to the second idler pulley arm.
Figure 5:
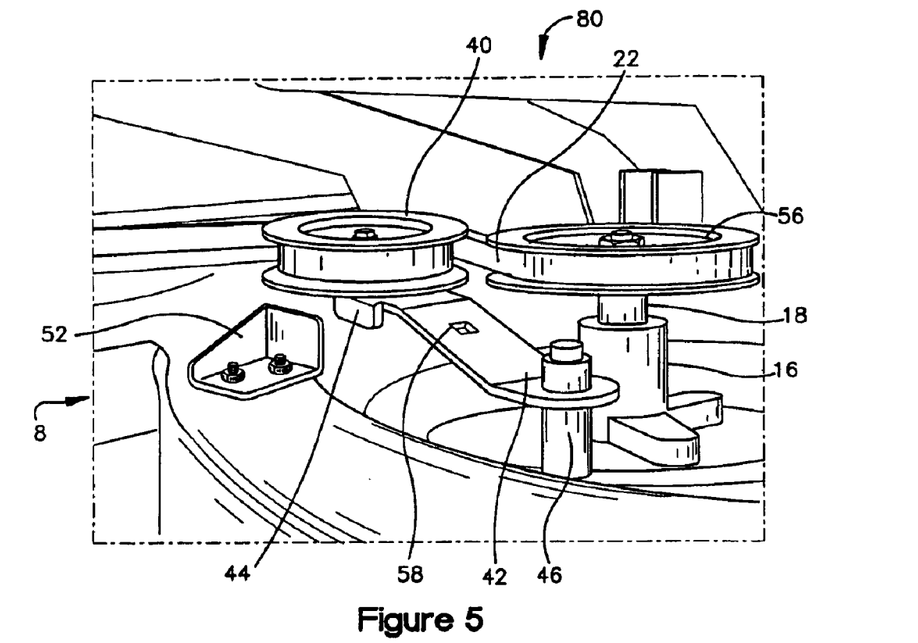
FIG. 5 is a close up view of a portion of the vibration damping assembly similar to that shown in FIG. 4 but from a different angle.
Figure 6:
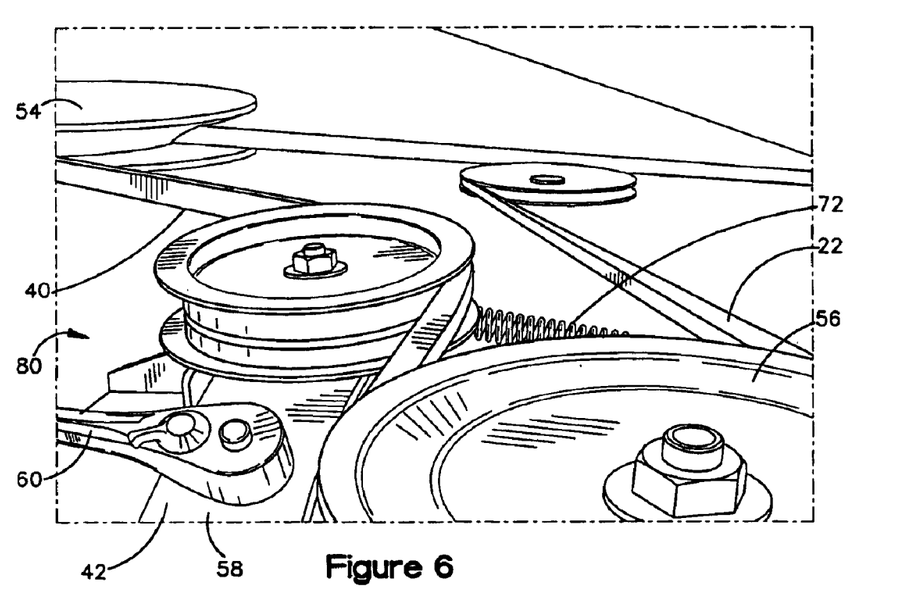
FIG. 6 is a close up view of a portion of the vibration damping assembly similar to that shown in FIG. 4 but from a different angle.
Figure 7:
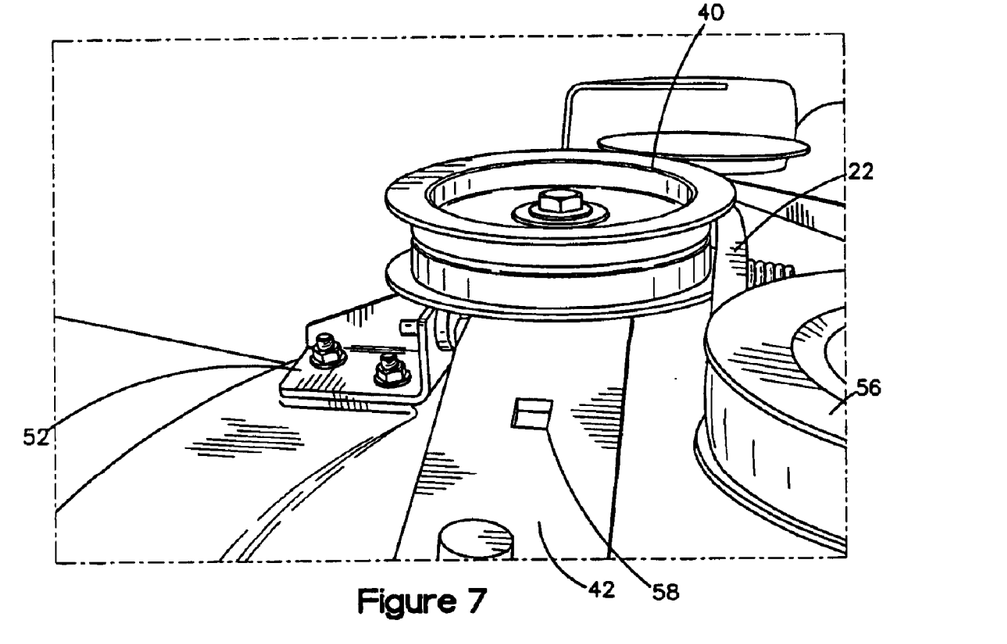
FIG. 7 is a close up view of a portion of the vibration damping assembly of FIG. 1 showing the second idler pulley being disengaged from the vibration damping assembly.
Figure 8:
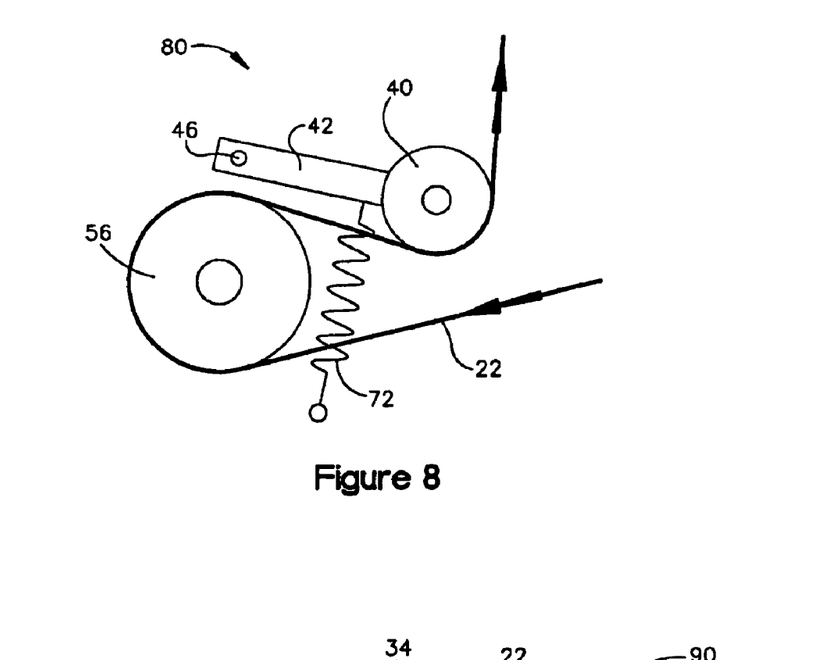
FIG. 8 is a close up view of a portion of a schematic representation of a pulley belt drive system showing the second idler pulley.
Figure 9:
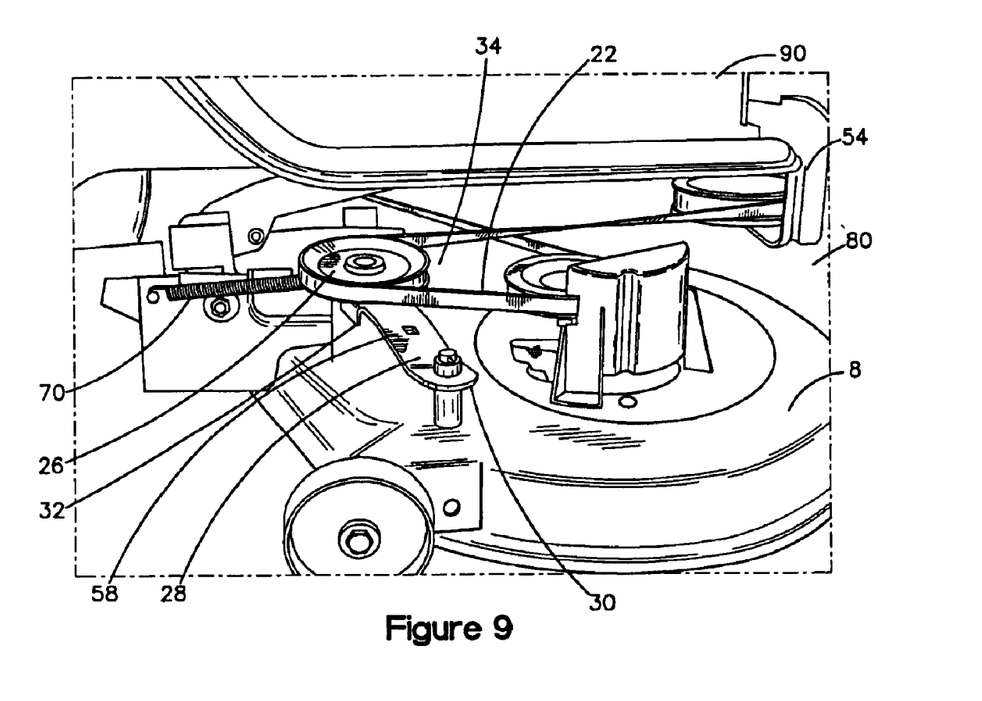
FIG. 9 is a close up view of a portion of the vibration damping assembly of FIG. 1 showing the first idler pulley attached to the first idler pulley arm.
Figure 10:
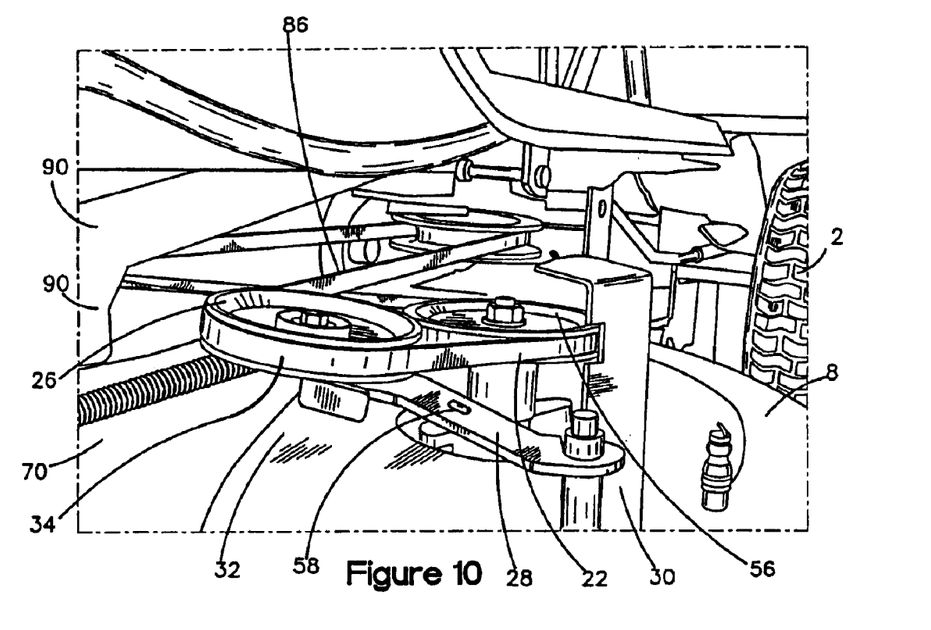
FIG. 10 is a close up view of a portion of the vibration damping assembly similar to that shown in FIG. 9 but from a different angle.
Figure 11:
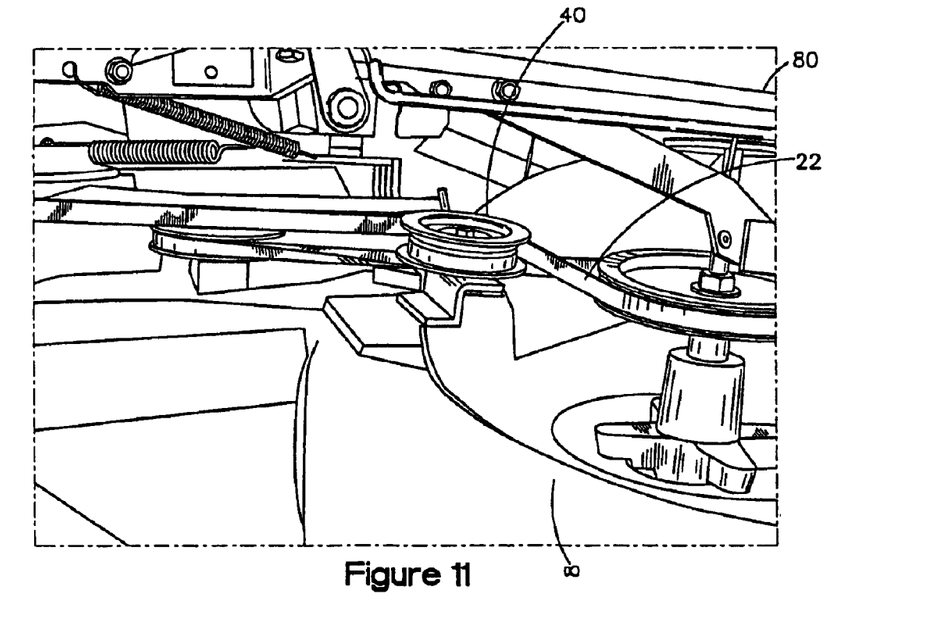
FIG. 11 is a close up view of one embodiment of the second idler pulley without an idler pulley arm.
Figure 12:
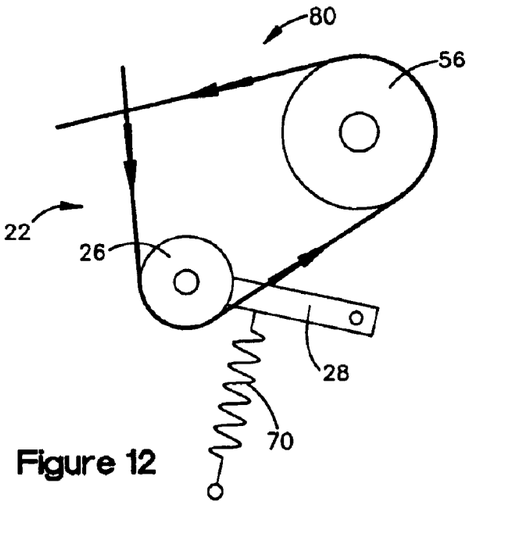
FIG. 12 is a close up view of a portion of a schematic representation of a pulley belt drive system showing the first idler pulley.
Figure 13:
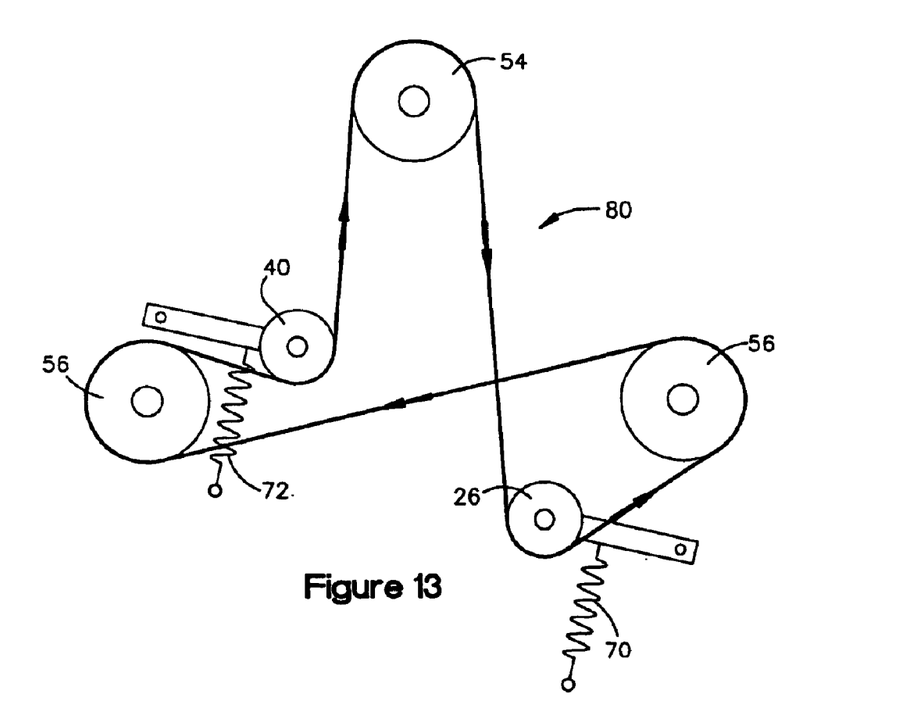
FIG. 13 is a schematic representation of the pulley belt drive system with vibration damping means showing the first and second idler pulleys.

With reference now to FIGS. 2, 4, and 5, as noted above, the mower deck 8 may include two cutting blades 12. It is noted that any number of cutting blades 12 may be connected to the mower deck 8 as chosen with sound engineering judgment. Each individual cutting blade 12 may be rotatably connected to a spindle 16 that includes a spindle shaft 18. Each spindle 16 is attached to and supported by the mower deck 8. As is well known in the art, rotation of a specific spindle shaft 18 causes a corresponding rotation of the corresponding cutting blade 12. In that the operation of spindles 16 for use on a mower deck 8 is well known in the art no further explanation will be offered at this point. The opposite end of the spindle shaft 18 may be fixedly attached to a blade pulley 56 for use in receiving a pulley belt 22. Rotation of the blade pulley 56 thus causes corresponding rotation of the corresponding cutting blade 12.

A pulley/belt drive system 80 includes a pulley belt 22, a blade pulley 56 and a drive pulley 54. The pulley belt 22 operatively connects each blade pulley 56 to a drive pulley 54. The drive pulley 54 is operatively connected to, and rotated by, the engine 6 in any manner chosen with sound engineering judgment. When power is selectively transferred to the drive pulley 54, the pulley belt 22 transfers power to the blade pulleys 56 and consequently rotates the cutting blades 12. In this manner, sufficient torque is transferred to the cutting blades 12 for severing the associated vegetation. In that the configuration of a mower deck 8 and pulley systems is well known in the art no further explanation will be offered.

With reference to FIGS. 2, 9, 10, and 12, the lawn tractor 1 has a vibration damping assembly 90. The vibration damping assembly 90 includes a first idler pulley 26 and a first idler pulley arm 28. The first idler pulley arm 28 has a first end 30 that is pivotally connected to the mower deck 8. Alternatively, the first pulley arm 28 could be pivotally connected to the frame 10. The first idler pulley arm 28 has a distal end 32 that is rotatably mounted to the first idler pulley 26 The first idler pulley 26 may include a groove 34 for use in receiving the pulley belt 22. As the belt 22 moves, the first idler pulley 26 rotates about the first idler pulley arm 28. Preferably, a first biasing means 70 is used to biasing the first idler pulley arm 28 such that the first idler pulley 26 maintains tension on belt 22. While the first biasing means 70 may be of any type chosen with sound engineering judgment, preferably it is a tension spring. As the pulley belt 22 tension fluctuates during operation of the mower deck 8, the first idler pulley 26 and first idler pulley arm 28, via the first biasing means 70, moves commensurate with the fluctuations in the pulley belt 22. This serves to prevent the pulley belt 22 from coming off the various pulleys (pulley wrap) of the mower deck drive system 80. In this way, the first idler pulley 26 takes up slack in the pulley belt system yet also serves to dampen some of the vibration. It should be noted that the first idler pulley 26 contacts the pulley belt 22 only on the slack portion 38 of the pulley belt 22.

With continuing reference to FIG. 2, placing a first idler pulley 26 with such a first biasing means 70 is well known in the art. However, while such idler pulleys work well in maintaining overall belt tension and maintaining pulley wrap when properly designed, such idler pulleys are ineffective in sufficiently damping vibrations. In an effort to dampen such vibrations, one may simply use a stronger spring 70 (that is, use a spring 70 with a higher spring rate that typically used). However, this also fails to provide the proper vibration damping effect and may increase the overall belt 22 tension to the point where the belt 22 is difficult to replace.

With reference to FIGS. 2, 4, 5, 6, 8 and 11 the vibration damping assembly 90 also includes a second idler pulley 40 and a second idler pulley arm 42 having a second biasing means 72. The second biasing means 72 is used to biasing the second idler pulley arm 42 such that the second idler pulley 40 maintains tension on belt 22. While the second biasing means 72 may be of any type chosen with sound engineering judgment, preferably it is a tension spring. The second idler pulley arm 42 may include a first end 44 and a second end 46, wherein the second idler pulley 40 is disposed at the first end 44 of the second idler pulley arm 42. The second end 46 of the second idler pulley arm 42 may be pivotally attached to the mower deck 8. Alternatively, the second idler pulley arm 42 could be pivotally connected to the frame 10. The assembly of the second idler pulley 40 and second idler pulley arm 42 may be positioned to allow the second idler pulley 40 to engage the pulley belt 22. The second idler pulley 40 operates to some extent as does the first idler pulley 26. In particular, as the pulley belt 22 tension fluctuates during operation of the mower deck 8, the second idler pulley 40 and second idler pulley arm 42, via the second biasing means 72, moves commensurate with the fluctuations in the pulley belt 22. This serves to prevent the pulley belt 22 from coming off the various pulleys (pulley wrap) of the mower deck drive system 80. In this way, the second idler pulley 40 takes up slack in the pulley belt system yet also serves to dampen some of the vibration. It should be noted that the second idler pulley 40 contacts the pulley belt 22 only on the tension portion 76 of the pulley belt 22.

With continuing reference to FIGS. 2, 4, 5, 6, 8 and 11, it should be noted that while the first idler pulley also dampens vibrations, it appears that the combination of both idler pulleys is required to provide sufficient vibration damping characteristics. The degree of vibration damping achieved by the combination of the two idler pulleys was unexpected. It should also be noted that the first biasing means 70 for the first idler pulley arm 28 preferably has a biasing tension force substantially similar to the biasing tension force of the second biasing means 70 for the second idler pulley arm 42. By substantially similar it is meant that the biasing tension force for the first biasing means 70 is preferably within +/−15% of the biasing tension force for the second biasing means 72; more preferably within +/−10% of the biasing tension force for the second biasing means 72; and most preferably within +/−5% of the biasing tension force for the second biasing means 72. Applicant has discovered that the closer the two biasing tension forces are to each other, the better the vibration damping characteristics. As a result, it is most preferred that the first and second biasing means 70, 72 be the same. This means that when springs are used as the biasing means 70, 72, both springs are substantially identical, having substantially the same spring rate. This also provides the advantage of simplifying manufacturing as only one kind (or type having the same spring rate) of spring is necessary for both applications.

Still referring to FIGS. 2, 4, 5, 6, 8 and 11, another advantage to the use of the two idler pulleys 26, 40 in combination is that the forces exerted on the mower deck 8 are reduced. In particular, this invention normalizes the belt tension in the portion of belt 74 between the two driven pulleys 56, 56. This normalized belt tension in turn reduces stresses on the mower deck 8 between the mounting points of the spindles 16, 16 that support the driven pulleys 56, 56. This reduction in stress extends the life of the mower deck 8 and also permits a relative decrease in gauge thickness of the deck material.

With reference now to FIGS. 4, 5, 7 and 8, a stopping means 52 may be incorporated that limits the amount of pivoting of the pulley arms 28, 42 to ensure that the pulley belt 22 does not come off the various pulleys. In the preferred embodiment, the stopping means 52 is a bracket fixedly or adjustably connected to the deck 8. By adjustably connected it is meant that the stopping means 52 may be selectively adjustable into various fixed positions from the corresponding idler pulley. This may be accomplished by providing slots or a plurality of holes in the deck 8 to receive threaded bolts and/or nuts (shown in the FIGURES). Alternatively, the stopping means 52 may be attached to the frame 10.

Referring now to FIGS. 10, 11, 12, and 13, in one embodiment the pulley belt 22 may be routed in such a way that the pulley belt 22 may actually loop around and cross under itself. What is meant by loop around and cross itself is that the pulley belt 22 may be routed from the drive pulley 54 to the first idler pulley 26 at an elevated position 86. The pulley belt 22 is then routed to the drive pulley 56. After engagement with the drive pulley 56 the pulley belt 22 may then be routed under the elevated section 86 of the pulley belt 22. Thus, in this embodiment, the blades 12, 12 are considered counter rotating blades. In other words, the two blades rotate in opposite directions (one rotates in a clockwise direction while the other rotates in a counter-clockwise direction). It is contemplated that the configuration of the pulley belt 22 may be such that the portion of the belt 22 from the drive pulley 22 to the first idler pulley 26 may be lower, rather than higher, than the section of belt 22 coming from the driven pulley 56. In another embodiment, the pulley belt 22 may be configured in such away to enable the blade pulleys 56, 56, and thus the blades 12, 12, to rotate in the same direction. This is the condition shown in FIG. 2.

With reference to FIGS. 6, 7, 9 and 10 the first and second idler pulley arms 28, 42 may include a notch or opening 58 for receiving a tool 60. The opening 58 may be configured to fit a standard ratchet tool 60. However, any size or configuration opening 58 may be fashioned in the arm 28, 42 for receiving any type of tool 60 for overcoming the bias force of the biasing means 70, 72. The opening 58 may be disposed at any position along the length of the arm 28, 42 as chosen with sound engineering principles. The operator may insert the tool 60 and pull to retract the idler arm 28, 42 for use in servicing the pulley/belt assembly 80.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A vibration damping mechanism for use with a lawn tractor adapted to reduce vibrations caused by operation of vegetation cutting blades of the tractor, the lawn tractor having a frame, an engine and a mower deck supported by said frame, said mower deck having at least first and second cutting blades mounted beneath the deck and first and second blade pulleys operatively connected to said first and second cutting blades, respectively, and a drive system comprising a drive pulley connected to a crankshaft of said engine and a drive belt operatively connecting said first and second blade pulleys to said drive pulley for transferring rotational energy from the drive pulley to said first and second blade pulleys, thereby causing rotation of said first and second cutting blades for cutting vegetation, the vibration damping mechanism comprising:

a first idler pulley for placing tension in said belt having a first spring biasing said first idler pulley into engagement with said belt, wherein said first idler pulley is positioned so as to contact said belt in a slack portion of said belt between the drive pulley and the first blade pulley; and a second idler pulley for reducing vibrations of said belt having a second spring biasing said second idler pulley in engagement with said belt, wherein said second idler pulley is positioned so as to contact said belt in a tension portion of the belt between the second blade pulley and the drive pulley.

2. The vibration damping mechanism of claim 1 wherein the biasing tension force of the first spring is within ±15% of the biasing tension force for the second spring.

3. The vibration damping mechanism of claim 1 wherein said vibration damping mechanism further comprises first and second pulley arms operatively connected to said first and second idler pulleys, respectively, wherein said first and second pulley arms further comprise an opening for receiving an associated tool.

4. The vibration damping mechanism of claim 1 wherein the position of said first idler pulley is elevated relative to the position of said second idler pulley.

5. The vibration damping mechanism of claim 1 further comprising first and second pulley arms operatively connected to said first and second idler pulleys, respectively, wherein said first and second idler pulley arm are pivotably attached to said deck, and further comprising stopping means positioned with respect to said pulley arms so as to limit the amount of pivoting of said first and second pulley arms.

6. The vibration damping mechanism of claim 1 wherein the first and second springs are substantially identical springs.

7. A lawn tractor comprising the vibration damping mechanism of claim 1.

* * * * *